United States Patent [19]

Newton et al.

[11] Patent Number: 4,675,111

[45] Date of Patent: Jun. 23, 1987

[54] SOLUTION WASTE TREATMENT MODULE

[75] Inventors: Charles L. Newton; Richard J. Girard, both of Clearwater, Fla.; William J. Cardin, Merrimack, N.H.

[73] Assignee: Micro-Plate Inc., Clearwater, Fla.

[21] Appl. No.: 631,489

[22] Filed: Jul. 16, 1984

[51] Int. Cl.$^4$ .................... B01D 39/16; C02F 1/62
[52] U.S. Cl. .................... 210/416.1; 210/496; 210/502.1; 210/912; 422/222; 502/159
[58] Field of Search ........... 210/719, 761, 762, 758, 210/912, 264, 289, 416.1, 485, 496, 502.1, 506, 508; 502/159; 422/211, 222

[56] References Cited

U.S. PATENT DOCUMENTS

| | | | |
|---|---|---|---|
| 3,442,802 | 5/1969 | Hamilton et al. | 210/63 |
| 3,445,001 | 5/1969 | Raus | 210/98 |
| 3,487,016 | 12/1969 | Zeff | 210/18 |
| 3,687,297 | 8/1972 | Kuhn et al. | 210/502.1 |
| 3,779,952 | 12/1973 | Leonard | 502/159 |
| 3,988,259 | 10/1976 | Ray | 210/762 X |
| 4,007,118 | 2/1977 | Ciambrone | 210/282 X |
| 4,092,250 | 5/1978 | Sano et al. | 210/502.1 X |
| 4,096,301 | 6/1978 | Slominski | 427/430 A |
| 4,238,328 | 12/1980 | Bowes | 210/502.1 X |
| 4,252,677 | 2/1981 | Smith | 502/159 X |
| 4,260,493 | 4/1981 | Kretas et al. | 210/716 X |
| 4,274,966 | 6/1981 | Palmer | 210/618 |
| 4,395,332 | 7/1983 | Klein | 210/502.1 X |
| 4,472,513 | 9/1984 | Menger-Hammond et al. | 502/159 X |
| 4,511,539 | 4/1985 | Stephenson | 422/211 X |

Primary Examiner—Tom Wyse
Attorney, Agent, or Firm—Robert L. Goldberg

[57] ABSTRACT

A module and process for removal of dissolved metal from a solution comprising converting said solution to an electroless plating solution and passing said electroless plating solution through a fixed bed of foam where the walls of the foam have been catalyzed with an electroless metal deposition catalyst.

21 Claims, 2 Drawing Figures

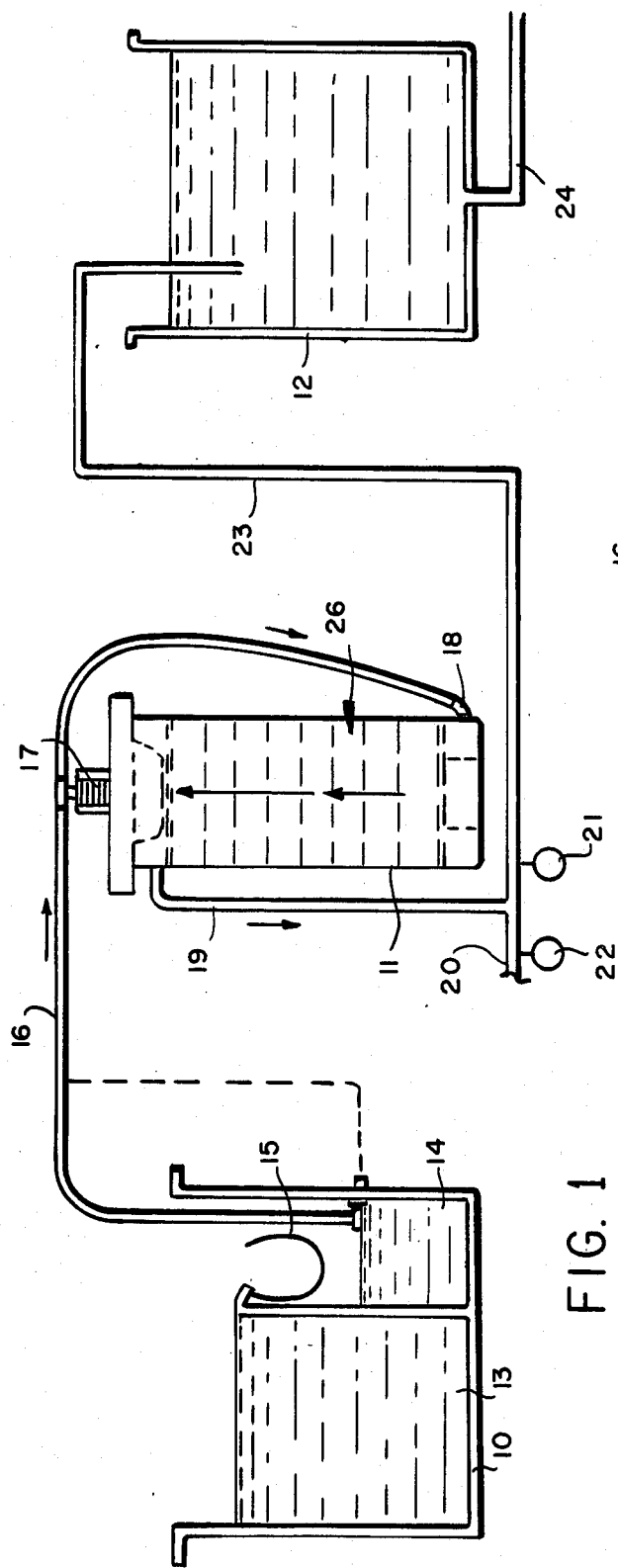
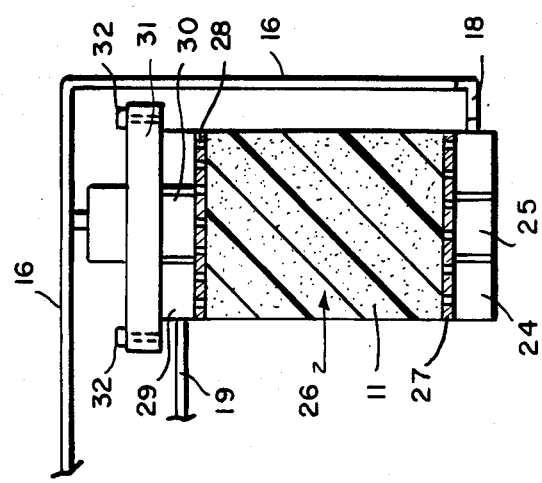
FIG. 1
FIG. 2

SOLUTION WASTE TREATMENT MODULE

BACKGROUND OF THE INVENTION

1. Field of the Invention

This invention is directed to a process for the waste treatment of solutions containing dissolved metals, espescially metal plating solutions, utilizing a metal recovery module containing a filler of catalyzed foam.

2. Description of the Prior Art

Solutions capable of plating metal are well known in the art. The most commonly used metal plating solutions comprise electrolytic and electroless solutions, the latter being capable of plating metal without the need for electricity.

The most frequently used electroless solutions for plating metal comprise copper and nickel plating solutions. Such solutions generally comprise four major ingredients dissolved in water. These ingredients include (1) a source of the metal plating ions, (2) one or more complexing agents capable of maintaining said metal ions in solution, (3) a reducing agent capable of reducing said metal ions to metallic form in the presence of a catalytic surface and (4) a pH adjustor to maintain solution pH within a desired range.

Electroplating solutions are used to plate a variety of metals and bear some resemblance to electroless plating solutions. However, they typically do not require reducing agents for plating and many do not require complexing agents.

The major ingredients of plating solutions are well known. Representative electroless nickel and copper plating solutions are disclosed in U.S. Pat. Nos. 3,329,512; 3,383,224; 3,650,777; 3,674,516; 3,915,715; and 4,036,651, all of which disclose the compositions of known plating solutions. The contents of these patents are incorporated herein by reference. Representative electrolytic metal plating solutions are disclosed in the *Metal Finishing Guidebook and Directory*, Metals and Plastics Publications, Inc., Hackensack. N.J. 1976, pp. 177 to 338. The contents of this portion of the handbook are also incorporated herein by reference.

It is known in the art than when electroless metal plating solutions are used, the content of various components of the solution are consumed. For example, as plating proceeds from an electroless plating solution, the concentration of both the metal and reducing agent are decreased. It is also known that metal plating solutions can be replenished by addition or replenishment of consumed ingredients to prolong the useful life of the solution. Thus, it is conventional to add a replenisher formulation consisting primarily of an aqueous solution of the metal salt and reducing agent. This results in an increase in the volume of the plating solution. Often, the excess solution must be waste treated.

Though the useful life of a plating solution may be prolonged by replenishment, eventually the solution becomes unsatisfactory and disposal is necessary. Consequently, the spent solution must be waste treated.

Another by-product of the plating operation is the rinse waters used to wash parts as they pass from one treatment solution to another. These rinse waters collect dissolved metal and other contaminants and often, these rinse waters must be waste treated. Consequently, there are numerous solutions resulting from the metal plating operation that must be waste treated including growth from the plating solution, spent solutions and rinse waters. Accordingly, for purposes of definition, the term plating solution as used herein is defined broadly to include solutions containing dissolved metals and in the case of electroless metal plating solutions, active complexing agent whether derived from the plating solution, rinse waters or growth or any combination of solutions resulting from a plating line.

The composition of several typical metal plating solutions, at initial make-up and when spent, are set forth below for purposes of illustration. The concentrations of the components of the spent solution are given as a range because they can vary within very broad limits dependent upon the source of the solution as discussed above. Hence, the ranges given should be viewed as illustrative only and should not be interpreted as limitations to the scope of the invention.

EXAMPLE 1*

(Electroless copper solution)

| Ingredient | Initial | Spent |
|---|---|---|
| Copper sulfate pentahydrate (gm) | 10 | 2–10 |
| Paraformaldehyde (gm) | 9.3 | 2–10 |
| Sodium Hydroxide (gm) | 25 | 5–25 |
| Pentahydroxypropyl diethylene triamine (gm) | 20 | 4–20 |
| Water | To one liter | |

*Example 1. U.S. Pat. No. 3,383,224

EXAMPLE 2*

(Electroless nickel solution)

| Ingredient | Initial | Spent |
|---|---|---|
| Nickel sulfate (gm) | 20 | 2–20 |
| Sodium Hypophosphite (gm) | 30 | 3–30 |
| Hydroxy acetic acid (ml) | 33 | 3–30 |
| Water | To one liter | |

*Example 44. U.S. Pat. No. 3,977,884

EXAMPLE 3*

(Electrolytic palladium solution - alkaline)

| Ingredient | Initial | Spent |
|---|---|---|
| Palladium (as diamino nitrite dissolved in dilute ammonia) (gm) | 15 | 3–15 |
| Ammonium nitrate (oz) | 12 | 2–12 |
| Sodium nitrite (oz) | 1.5 | 0.3–1.5 |
| Ammonium hydroxide to pH | 9 | 7–10 |
| Water | To one gallon | |

*Page 286, Metal Finishing Guidebook, supra

From the above formulations, it can be seen that the spent solutions may contain substantial quantities of metal and complexing agents, even though ready for disposal. These materials present a problem because discharging dissolved metals directly into effluent streams, other than in minute quantities, is prohibited by federal and many state regulations.

In addition, even after the dissolved metal content of spent solutions has been reduced to acceptable levels, the complexing agent in the spent solution is often intact. Hence, the complexing agent in the solution is able to complex with any of a variety of metals that it comes into contact with as it is pumped to the point of discharge. The result is that even following treatment to remove dissolved metals, it may be desirable to treat the solution to inactivate or destroy the complexing agent before discharge to prevent the metal content of the solution from becoming prohibitively high as a consequence of the active complexing agent dissolving metal residues.

A process for waste treatment of a plating solution containing dissolved metals and complexing agents is described in U.S. Pat. No. 4,260,493, incorporated herein by reference. The preferred method in that patent is to remove the metal content by contact of the plating solution with a dispersed particulate phase of high surface area that has been treated with a catalytic material to render the dispersed phase an electroless metal plating catalyst (referred to in said patent as a "seeder"). Preferably, following metal removal, the solution undergoing treatment is subjected to a step of hypochlorination to destroy the complexing agent and render it inactive. Accordingly, the preferred method for removing dissolved metal values from solution set forth in the cited patent comprises contact of the spent solution with seeder prepared by soaking a particulate, porous material of high surface area, e.g., a filter aid material (inclusive of granulated carbon), in a solution of a material catalytic to the deposition of the dissolved metal, preferably a colloidal catalyst. Palladium is the preferred catalytic material but other precious metals such as gold, silver and other noble metals may be used as well as other metals known to be catalytic to electroless metal deposition. A spent solution of CATALYST 6F, an aqueous, highly acidic colloid of palladium and stannous tin sufficient to reduce and maintain the palladium in colloidal form, is described therein as suitable material in which to soak the particulate material. The catalytic material is absorbed into the pores of the particulate material making the particulate material catalytic to the deposition of the electroless metal in the plating solution. Variables such as contact time of the particulate material with the catalyst solution is dependent upon the concentration of the catalytic material in solution and the porosity and surface area of the particulate material. Typically, the particulate material should be in contact with the catalytic material for at least five minutes, and preferably, in excess of ten minutes.

For more reproducible results, a fresh solution of palladium catalyst such as CATALYST 6F is stated to be preferred, preferably diluted to less than twenty percent of its normal strength and more preferably diluted to less than 100 parts palladium per million parts of solution. The dilution is stated therein to be desirable to avoid triggering of the solution when adding seeder to the solution to be treated. "Triggering" a solution is a term used in the art to refer to a solution undergoing uncontrolled spontaneous decomposition. One consequence of triggering is that metal fines can be formed which are difficult to separate from solution. Another consequence is that on occassion, the metal values precipitate onto the walls of the reactor containing the spent solution and are difficult to remove.

The above patent avoids the problem of triggering by solution agitation to avoid localized areas of high seeder concentration and diluting the solution of palladium catalyst to much less than its normal strength to prevent over catalyzation of the spent solution. The contact time of the seeder with the spent solution was stated to be about 10 minutes to in excess of three hours after which a means of separating the seeder from the solution was required. Filtration such as by a bag filter was suggested. The preferred method, especially for use in a continuous process, used a series of overflow separation tanks which combined the steps of contact with seeder and physical separation into a single step. A suggested alternative was to stop agitation permitting the seeder to settle, followed by decantation.

Each of these possibilities has disadvantages in that filtration must take place and the possibility of triggering is always present. Furthermore, either the line must be shut down for a period of time or separate tanks must be dedicated to the destruction of spent material. In addition, when re-using seeder which has been previously employed, care must be used to ensure that the separation process used has not destroyed the ability of the seeder to plate out metal values and that the used seeder still has sufficient catalytic activity to reduce the metal values in the spent solution to acceptable values. Care also must be exercised in the storage and transportation of new seeder to ensure that its plating ability is not lost as might occur upon its contact with oxidizing agents such as air.

In U.S. patent application Ser. No. 236,776 filed Feb. 23, 1981, incorporated herein by reference, there is disclosed a pre-plumbed module filled with the seeder of the aforesaid patent and a pH adjusting solution to allow for shipping of the module. The module is connected to the growth tank of a plating line and excess solution is fed to the module by either gravity or a pump. When the module is saturated, it is replaced by a fresh module. The saturated module is sent to a recycling facility for recovery of the metal and recharging of the module.

The module of the aforesaid application is an improvement over the use of seeder as disclosed in the aforementioned patent. However, it still suffers certain disadvantages. For example, though it was believed that channelling of solution through the seeder bed was not a problem when the module was first developed, it was found that channelling may occur resulting in insufficient removal of dissolved metal. Also, from time to time, metal plate-out occurred primarily in an isolated portion of the module resulting in plugging of the module before it was saturated with plated metal. In addition, it was found that the seeder became inactivated prior to use if permitted to dry and consequently, the module had to be shipped filled with liquid to both maintain the seeder wet and to maintain the appropriate pH at the seeder-liquid interface. Finally, to prevent loss of catyalytic activity, it was found that the seeder had to be partailly coated with copper which added to the expense of preparing the seeder.

SUMMARY OF THE INVENTION

In accordance with the subject invention, there is provided a waste treatment module containing catalyzed, reticulated or open celled synthetic foam in place of the particulate seeder used in the earlier described module.

The use of catalyzed foam permits efficient removal of metal values from a solution containing dissolved metal without the problem of channelling and/or plugging of the module with deposited metal prior to saturation. Moreover, by substitution of catalyzed foam for particulate seeder, the module may be shipped to a user dry and the module may be of a simplified construction. Further, the open celled foam may comprise up to 97% pores thereby occupying substantially less volume than seeder which permits an increased amount of metal to be removed. Additionaly, when the catalyzed foam is saturated with metal, it may be removed and with replacement catalyzed foam inserted. Another advantage of the catalyzed foam is that it acts as a filter for metal fines within the plating solution as the fines are removed if the plating solution is circulated from the plating tank through the module and back into the plating tank.

Accordingly, there is provided herein a module for the waste treatment of a solution containing dissolved metal which permits removal of said dissolved metal by passing the same through a module containing a bed of catalyzed, open cell foam whereby clean effluent may be removed from the module which can be passed to any non-metal bearing waste treatment stream for further processing, recycling or disposal.

In the preferred embodiment of the invention, a preplumbed module filled with catalyzed foam is connected to the growth tank of a plating line and excess solution is fed to the module, preferably using a metering pump. When the module is saturated, it is replaced with a fresh module or the foam, saturated with deposited metal is removed and replaced by fresh foam. Alternatively, the module containing the foam saturated with deposited metal may be sent to a recycling facility for recovery of the metal and recharging of the foam.

BRIEF DESCRIPTION OF THE DRAWINGS

FIG. 1 is a schematic representation of equipment for waste treatment in accordance with the invention including a plating tank preceding the module and an optional chelate destruct tank following the module; and FIG. 2 is an illustration of a module for removal of metal values in accordance with the subject invention.

DESCRIPTION OF THE PREFERRED EMBODIMENTS

From the formulations given above for typical plating solutions (Examples 1 to 3), it is apparent that a solution to be waste treated might contain substantial quantities of dissolved metals. In general, as discussed above, The dissolved metal content can vary within very wide limits dependent upon the source of the specific solution treated. For example, rinse waters are frequently mixed with a spent plating solution prior to waste treatment. Solutions so mixed are within the scope of this invention. Solutions mixed with rinse waters would have a lower content of dissolved metal and complexing agent than solutions composed of excess growth or solution no longer usable because their plating properties have become unpredictable. For purposes of illustration only, the metal content of a conventional spent solution to be treated in accordance with this invention may vary between 0.1 and 50 grams per liter and more typically, between 2 and 25 grams per liter.

FIG. 1 is a schematic representation of equipment that may be used in accordance with the invention to waste treat a solution containing dissolved metal values. In FIG. 1, a system is illustrated suitable for the waste treatment of the growth resulting from replenishment of a plating solution. The equipment comprises plating tank 10, waste treatment module 11 and optionally, waste treatment tank 12.

Plating tank 10 comprises plating chamber 13 and overflow chamber 14 to handle solution growth. The overflow may, if desired, pass through a filter such as filter bag 15. Plating tank 10 contains an electroless plating solution such as any of those described above.

Solution to be treated is removed from overflow tank 14 through conduit 16 preferably by means of metering pump 17. Gravity feed or conventional pumping means may be employed, but a metering pump is preferred to carefully control the flow of liquid through module 11. Fluid enters module 11, preferably into the lower portion of the module, through connector 18 and passes upwards through module 11 through a fixed bed of catalyzed foam 26 as will be explained in greater detail below. Dissolved metal is deposited within the pores of the foam as it passes upwards through the module. The treated solution leaves module 11 through exit conduit 19. At this point in the process, the solution is essentially water white as substantially all metal should have been removed from solution. The solution may now be passed for further processing through line 20 or passed into tank 12 by opening valve 21 and closing valve 22 thereby passing the solution through conduit 23.

Often, solutions of the type treated in accordance with the invention will contain components which prevents discharge of the solution to the environment. For example, such solutions often contain complexing agent which require further treatment. This treatment occurs in tank 12. Following such treatment, the solution is discharged through conduit 24.

FIG. 2 depicts module 11 in partial section. Liquid containing dissolved metal enters module 11 through feed line 16 and connector 18. An open space 24 is created at the bottom of module 11 by use of spacer 25 which may be a circular wedge attached to or inserted into the bottom of the module. Catalyzed open cell foam 26 is stored within module 11. It is supported on perforated plate 27. The liquid to be treated passes through plate 27 and percolates upwards through the fixed bed of catalyzed foam 26 as a consequence of a pressure head created by metering pump 17. Metal plates onto the cell walls of the catalyzed foam 26 as it passes through the same. At the top of module 11, there is a second perforated plate 28. Liquid passes through this perforated plate into open space 29 created by spacer 30 similar in construction to spacer 25 at the bottom of the module.

If an electrolytic plating solution is to be waste treated, apparatus similar to that described above would have to be used, but provision would have to be made for addition of reducing agent, complexing agent, pH adjustor, etc. in order that the solution would function as an electroless plating solution during passage through the module.

The module is shipped to a customer ready for use. Once the module is saturated with deposited metal, it may be disassembled by removal of cover 31 which is preferably attached to the module by bolts 32. To simplify the process, metering pump 17 is removably secured to cover 31 and feed line 16 is flexible, such as of flexible hosing. Once cover 31 is removed, the saturated foam may be lifted out of module 11 and fresh foam inserted. Occasionally, it may be necessary to tap the sides of the module to remove the saturated foam. Upon replacement of the cover 31, and attachment of line 16, the module is ready for continued use.

The catalyzed foam is formed from any chemically resistant, reticulated or open celled foam capable of passing liquids. Such materials are well known in the art and include foams from resins such as ABS, acetal phenylene oxides, nylon, polycarbonate, polyester, polypropylene, polystyrene, polysulfone and PVC. The preferred foams are those that are resilient and have a high open cell content, preferably in excess of 90 percent and more preferably, in excess of 95 percent.

The catalyzed foam is prepared by immersing the open celled foam in a solution of a plating catalyst such as a tin-palladium plating catalyst as disclosed in U.S. Pat. No. 3,011,920. The catalyst fill the pores of the foam with palladium absorbing onto the walls of the foam, whereby the walls of the foam become catalytic to electroless metal deposition. A typical immersion time in the catalyst would be approximately 10 minutes. If desired, the catalyst can be a spent catalyst solution or a fresh catalyst solution used at full concentration (100 ppm palladium) or diluted with as much as 9 parts acidified water per one part of catalyst solution. Thereafter, the foam is removed from the catalyst solution, the catalyst is permitted to drain from the foam and the foam can be subjected to a step of acceleration if desired. This involves immersing the foam in a solution of accelerator as taught in the aforesaid patent. Thereafter, the catalyzed foam is rinsed and dried and is then ready for use by insertion into the module.

An alternative method of formation of the catalyzed foam comprises inserting untreated foam into the module and passing catalyst solution from a conventional plating line through the module for a limited period of time, e.g. ten minutes, to catalyze the foam and render it suitable for use to waste treat solution containing dissolved metal values. If desired, accelerator from the same plating line can be passed through the module following catalysis.

For the catalyzed foam to remove sufficient dissolved metal to meet regulations governing discharge to the environment, the spent solution containing dissolved metal must function as an electroless plating solution. Therefore, it may be necessary to add reducing agent and pH adjustor to the solution. In addition, the spent solution cannot contain ingredients antagonistic to the plating solution such as cyanides or other materials which can act to poison the solution.

To facilitate the adjustment of the spent solution containing dissolved metals, such that it functions as an electroless plating solution, module 11 may optionally be preceded by a preparation tank (not shown) equipped with heater to insure that the solution is heated to the appropriate temperature for plating and a mixer to insure that pH adjustor and reducing agent added to the solution are uniformly mixed. Preferably, the reducing agent is added in stoichiometric excess of the dissolved metal contained in solution and more preferably, is always in excess of 2 grams per liter of solution. Also, metal is preferably plated onto the catalyzed foam under those conditions normally used for a plating solution from which the spent solution is derived. For example, a solution that is operated hot should be heated for plate-out onto catalyzed foam. If the metal to be removed is copper from an alkaline copper plating solution, formaldehyde is conveniently used as the reducing agent and the solution is preferably adjusted to pH above 12 by addition of sodium hydroxide.

In addition to a solution containing dissolved metal such as a spent plating solution, the tank preceding module 11 can also be used to prepare rinses, chelated alkaline cleaners and alkaline etchants for subsequent metal removal utilizing module 11.

Depending upon the concentration of complexing agent in solution, if the solution to be treated is a spent electroless plating solution, it may be desirable to further treat the solution in chelate destruct tank 12. Tank 12 is optionally equipped with a mixer (not shown) to ensure complete mixing of its contents. The preferred method of accomplishing destruction or inactivation of complexing agent is described in U.S. Pat. No. 4,420,401, incorporated herein by reference. The preferred method of the patent comprises contact of the solution containing complexing agent with a halogen. The preferred halogen for inactivating complexing agent is chlorine and the most expeditious method of adding the chlorine is in the form of an alkali or alkaline earth metal hypochlorite, most preferably in the form of an aqueous solution of sodium hypochlorite.

Following dilution, pH adjustment may be necessary. The inactivation of the complexing agent is not heavily pH dependent and can be accomplished over a wide range of pH. In this respect, pH can vary between about 2.0 and 12.5. However, it is known that an explosive gas mixture can be formed by acid contact of ammonia with a hypochlorite. Moreover, regulations require discharge of waste solution within a pH range of from 6.5 to 9.0. Accordingly, a preferred pH range is from 7 to 10, and the most preferred range is between about 9 and 10, it being understood that the pH drifts lower as the reaction proceeds.

The concentration of the halogen used is that amount necessary to inactivate substantially all of the complexing agent. Preferably, the concentration of the halogen is in molar excess of the concentration of the complexing agent, preferably, from 1 to 25 moles of halogen are used per mole of complexing agent and more preferably, from about 5 to 20 moles per mole of complexing agent.

Contact time of the halogen with the spent solution is that time necessary to inactivate the complexing agent. The reaction is not instantaneous and generally, in excess of 10 minutes contact time is required. Preferably, the contact time is at least 1 hour and frequently, from 2 to 4 hours are required, though the reaction is temperature dependent and elevated temperatures reduce the contact time.

Other conditions governing the inactivation step are not critical. The temperature is preferably room temperature but this is not mandatory and if the solution temperature is above room temperature as a consequence of an exotherm, this does not deleteriously affect the reaction. Preferably, agitation is used during contact of the halogen with the spent solution.

Following inactivation of the complexing agent in the spent solution, the pH of the solution may require adjustment to an acceptable level for discharge to the environment. Current regulations permit discharge within a pH range of from 6.5 to 9.5. Therefore, if the inactivation step is performed within the preferred range of pH, the solution may be discharged without further pH adjustment.

Module 11 is designed to be an integral unit readily attached and unattached from feeding and exit piping and readily shipped. For example, module 11 can comprise an integral container having a volume of approximately 5 gallons. If recycling is expected, module 11 can optionally be equipped with a resealable cover. Module 11 and the pipe used therewith are preferably made of material inert to the solution to be treated, a preferred material being polyethylene. Pipes 16 and 19 are then attached to the module 11 with each of the pipes having means for attachment to allow each pipe to be sealed for shipping and then opened and appropriately connected for use in the process of the invention.

To use module 11 in accordance with the invention, it is placed in close proximity to a plating tank and the necessary piping is attached to connect the module to the tank containing solution to be treated. Solution is then pumped through module 11 at a rate dependent upon the size of the module. For a module having a capacity of 15 gallons, solution is preferably pumped through the module at a rate of about from 20 to about 60 gallons per hour and more preferably, at a rate of about 35 gallons per hour. For a module with about a 15 gallon capacity, when using the overflow of a standard copper plating solution as the solution to be treated, the module will be filled to capacity after about 4,000 gallons have been metered through the module. When the module is saturated, the cover of the module may be removed, the side of the module tapped with a hammer to loosen the catalyzed foam from the walls of the module and the module tipped to remove the foam therefrom.

The following examples will better illustrate the process of this invention.

EXAMPLE 4

This example illustrates the preparation of catalytic foam that will be used for treatment of spent solution in subsequent examples.

The foam used in this example is an open celled polyester foam having an open pore volume of about 97 percent of the foam and from about 30 to 80 pores per inch. The first step in the preparation of the catalyzed foam is to immerse the foam in a palladium catalyst sold under the tradename Catalyst 9F, which catalyst has been diluted with hydrochloric acid and an acid solution of stannous tin to about 0.02 percent of its packaged strength so that its palladium content is about 0.0004 grams per liter. The foam is held in the catalyst solution for about 10 minutes after which time it is removed and catalyst is allowed to drain therefrom. The foam is then immersed in water and permitted to dry.

EXAMPLE 5

This example represents a treatment procedure for a spent copper plating solution. The solution treated is a used solution sold under the tradename CP-78. The formulation of the used solution, prior to treatment is as follows:

| | |
|---|---|
| Copper (as cupric sulfate pentahydrate) | 7 grams per liter |
| Pentahydroxypropyl diethylene triamine | 14 grams per liter |
| Formaldehyde (Free) | 2.5 grams per liter |
| Sodium Hydroxide | 5.8 grams per liter |
| Water | to one liter |

The solution also contains minor quantities of other proprietary additives, but these are not believed to be relevant to the process disclosed herein because they are present in minute quantities and they are not involved in the described waste treatment procedure.

The above formulation requires both pH adjustment and addition of reducing agent because the concentration of each ingredient is insufficient for the formulation to adequately function as a plating solution. Accordingly, 1 gram of formaldehyde and 2 grams of sodium hydroxide are mixed into the above formulation. The temperature of the solution is increased slightly to about 90° F. as this is the recommended temperature for use of a CP-78 plating solution.

A module as described above is prepared by adding catalyzed foam prepared in accordance with the procedures of Example 4 to a 5 gallon polyethylene container which is equipped with a removable cover, a metering pump, an inlet at the bottom of the container and an outlet at the top of the container. The solution is pumped through the module at a rate of about 40 gallons per hour and the solution leaving the module has a copper content of less than 2 parts per million parts of solution.

EXAMPLE 6

The procedure of Example 5 can be repeated for an electroless nickel plating solution having a formulation as follows:

| | |
|---|---|
| Nickel sulfate hexahydrate | 12 grams |
| Sodium hypophosphite monohydrate | 15 grams |
| Hydroxyacetic acid | 24 grams |
| Ammonium hydroxide | to pH 4.5 |
| Water | to one liter |

In order to produce an active plating solution, the pH would be maintained at about 9 or above and it may be necessary to add additional hypophosphite to produce an active plating solution before treatment begins. A module comparable to that described in Example 5 would be used and the temperature of the solution to be treated would preferably be adjusted to about 50° C. A hot acid electroless nickel plating bath is make alkaline to pH of from about 8 to 9 to plate metal from solution at lower temperatures, e.g. 80° to 90° C.

We claim:

1. A module for use in a process for removing dissolved metal from a solution in which said metals are dissolved and retaining removed metals within the module, said module comprising a container having within it a catalyzed open celled foam catalytic to electroless deposition of the dissolved metal, said catalyzed foam being a reticulated, open celled foam having colloidal noble metal absorbed onto the walls of its open cells, said container having an inlet and outlet and means to pass solution through said container and through said foam whereby metal is deposited onto the catalyzed walls of the foam and removed from solution.

2. The module of claim 1 where said foam is a fixed bed within said container.

3. The module of claim 2 where the open cells of the foam comprise at least 90 percent of the total volume of the foam.

4. The module of claim 3 where the open cells comprise at least 95 percent of the total volume of the foam.

5. The module of claim 2 where the noble metal is palladium.

6. The module of claim 5 where the foam is inert to a solution containing dissolved metal.

7. The module of claim 5 where the foam is selected from the group of foams of polycarbonate, polyester, acrylonitrile butadiene styrene copolymers, acetal phenylene oxides, polypropylene, polystyrene, polysulfone and polyvinyl chloride.

8. The module of claim 7 where the foam is of as polyester.

9. The module of claim 5 where the module has an open space above and below the foam within the container.

10. The module of claim 5 where the inlet to the module is at its lower end, the outlet to the module is at its upper end and the foam is placed between said inlet and said outlet.

11. The module of claim 10 where the inlet and outlet are in open communication with spaces and said foam is placed between said inlet and outlet spaces.

12. The module of claim 11 where the foam fills the entire container between said inlet and outlet spaces.

13. The module of claim 5 where the means to pass solution through the container and foam is a pump.

14. The module of claim 13 where the pump is a metering pump.

15. A module for use in a process for removing dissolved metal from solution while retaining the same within said module, said module comprising a container containing a catalyzed open celled foam catalytic to the deposition of the dissolved metal, said catalyzed foam being a reticulated, open celled foam catalyzed with colloidal palladium with the open cells comprising at least 90 percent of the total volume of the foam, said container having an inlet at its lower end and an outlet at its upper end where each of said inlet and outlet are adjacent an open space within said container, said catalyzed foam filling the entire container between said open spaces, and means to pass solution through said container and through said foam.

16. The module of claim 13 where said foam is a fixed bed within said container.

17. The module of claim 15 where the open cells comprise at least 95 percent of the total volume of the foam.

18. The module of claim 15 where the foam is selected from the group of foams of polycarbonate, polyester, acrylonitrile butadiene styrene copolymers, acetal phenylene oxides, polypropylene, polystyrene, polysulfone and polyvinyl chloride.

19. The module of claim 18 where the foam is of as polyester.

20. The module of claim 15 where the means to pass solution through the container and foam is a pump.

21. The module of claim 20 where the pump is a metering pump.

* * * * *